United States Patent [19]
Mueller

[11] 3,768,006
[45] Oct. 23, 1973

[54] METHOD AND APPARATUS FOR DIRECT MEASUREMENT OF PERCENT

[75] Inventor: Allen Howard Mueller, Houston, Tex.

[73] Assignee: Daniel Industries, Inc., Houston, Tex.

[22] Filed: Oct. 30, 1972

[21] Appl. No.: 301,826

[52] U.S. Cl. ............................. 324/61 R, 73/304 C
[51] Int. Cl. ............................................. G01r 27/26
[58] Field of Search ................. 324/61 R; 73/304 C, 73/74; 340/235, 244 C

[56] References Cited
UNITED STATES PATENTS

| | | | |
|---|---|---|---|
| 3,006,189 | 10/1961 | Warren et al. ................. | 324/61 R X |
| 3,340,400 | 9/1967 | Quittner ........................ | 324/61 R X |
| 3,546,926 | 12/1970 | Dunavent, Jr. et al. ....... | 324/61 R X |
| 3,408,566 | 10/1968 | Norwich ........................ | 324/61 R |
| 3,684,953 | 8/1972 | Grant ............................ | 324/61 R |
| 3,684,954 | 8/1972 | Jaggers et al. .................. | 324/61 R |

*Primary Examiner*—Stanley T. Krawczewicz
*Attorney*—Tom Arnold et al.

[57] ABSTRACT

In one preferred embodiment, a percentage water measuring circuit is shown by providing a capacitance probe for measuring the capacitance of an oil-water emulsion, a reference capacitor of known value in series with capacitance probe, a variable gain a-c voltage generator connected in series with the reference capacitor and the capacitance probe for applying an a-c voltage across each, a voltage measuring circuit for measuring the actual voltage differential across the capacitance probe, an error detecting circuit for detecting the difference between the actual voltage differential across the capacitance probe and a predetermined voltage, the error detecting circuit controlling by a feedback path the variable gain generator to maintain the voltage differential across the capacitance probe at the predetermined level, a voltage measuring circuit for obtaining the voltage differential appearing across the reference capacitor, the voltage differential being directly related to the percentage water appearing in the oil-water emulsion, and a nonlinear to linear function generator to convert the voltage differential to a linear function with respect to percentage water.

40 Claims, 6 Drawing Figures

| CRUDE | °API | ε |
|---|---|---|
| 1 | 18.6 | 2.64 |
| 2 | 39 | 2.18 |
| 3 | 31 | 2.51 |
| 4 | 24.4 | 2.68 |
| 5 | 26.2 | 2.25 |

METHOD AND APPARATUS FOR DIRECT MEASUREMENT OF PERCENT

BACKGROUND OF THE INVENTION

This invention relates to percentage water measuring circuits for measuring the percentage water in an oil-water emulsion flowing in a pipeline.

The change of dielectric constant of an oil-water emulsion, as a function of percent water, has for some time been recognized and used to determine the percent water present in crude oil. Some basic advantages of this method of measurement are: strong dependence of dielectric constant of the emulsion on the percent water; the basic insensitivity of this measurement to flow rate; the measurement can be continuous on the emulsion as it flows through a pipe; the measurement can be made without the use of moving parts; and the capacitance method has been considerably more economical over other known methods with reference to the data obtained.

However, the conventional and prior art capacitance probes and circuits on the market today have had a number of problems associated with them, such as: limited accuracy of measurements; limited as to range of dielectric constant for oil that circuits are capable of handling; difficult or impossible to accurately calibrate the circuitry in the field; limited as to the interchangeability of electronic circuitry without difficult recalibration; non-standard as to output, i.e., output is not correlatable to percent water without additional information; and not readily adaptable for remote calibration.

The dielectric constant of water is given in various handbooks as being about 80. For the operating frequency chosen, measurements on even fresh water indicate a conductivity so high as to be able to consider the dielectric constant to be infinite for all practical purposes. Crude oil has a dielectric constant ranging from about 2.0 to 3.0. From the nature of oil-water emulsions, it can be deduced that water added to and suspended without the oil acts as a multiplier to the dielectric constant of the oil. For example, if a certain percent of water was added to an oil with a dielectric constant of 2.0 so as to increase its dielectric constant to 4.0, the same percent water added to an oil with a dielectric constant of 3.0 would increase its dielectric constant to 6.0.

SUMMARY OF THE INVENTION

Unlike any other capacitance probe, the basic measurement of this invention is the ratio of the capacitance produced by the emulsion to that produced by pure oil. This approach can be appreciated when considering the fact that the water in an oil-water emulsion affects the dielectric constant in a highly nonlinear manner. This ratio, though nonlinear, can be converted to percent water through fixed circuitry, since a change of oil dielectric constant does not affect the ratio with respect to percentage water. Accordingly, the present invention remedies the problems of the prior art by providing a capacitance probe means for measuring the capacitance of the oil-water emulsion, a reference capacitor of known value in series with the capacitance probe means, a variable gain a-c voltage generator connected in series with the reference capacitor and the capacitance probe means for applying an a-c voltage across the capacitor and probe means, voltage detecting means for detecting a change in the voltage differential across said probe means and controlling the gain of said a-c voltage generator for maintaining a predetermined a-c voltage applied across the probe means, and voltage measuring means for measuring the voltage differential applied across said reference capacitor as a measure of the percentage water content of the oil-water emulsion. Additionally, the apparatus includes a function generator means for receiving the measured voltage differential from the voltage measuring means and converting the voltage differential from a nonlinear to a linear function with respect to percentage water, multiplying means for multiplying the voltage output from the function generator by a preselected constant, and a voltage to current conversion means to convert the multiplied d-c voltage signal output from the multiplying means to a direct current the magnitude of which is representative of the percentage water content of the oil-water emulsion.

Accordingly, one primary feature of the present invention is to provide a percentage water measuring circuit that will measure the complete range of oil dielectric constants of 2.0 to 3.0 without need for special calibration.

Another feature of the present invention is to provide a percentage water measuring circuit that measures the voltage differential across a reference capacitor in series with the capacitance measuring probe to obtain the value of the percentage water present in the oil-water emulsion.

Yet another feature of the present invention is to provide a percentage water measuring circuit that utilizes a single calibration control.

Still another feature of the present invention is to provide a percentage water measuring circuit that has a remote calibration capability.

Another feature of the present invention is to provide a percentage water measuring circuit that utilizes a measure of the ratio of the dielectric constant of an oil-water emulsion to the dielectric constant of oil as the measure of the percentage water in the emulsion.

BRIEF DESCRIPTION OF THE DRAWINGS

In order that the manner in which the above-recited advantages and features of the invention are attained, as well as others which will become apparent, can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the Drawings.

DETAILED DESCRIPTION OF THE PREFERRED EMBODIMENTS

Figure 1:
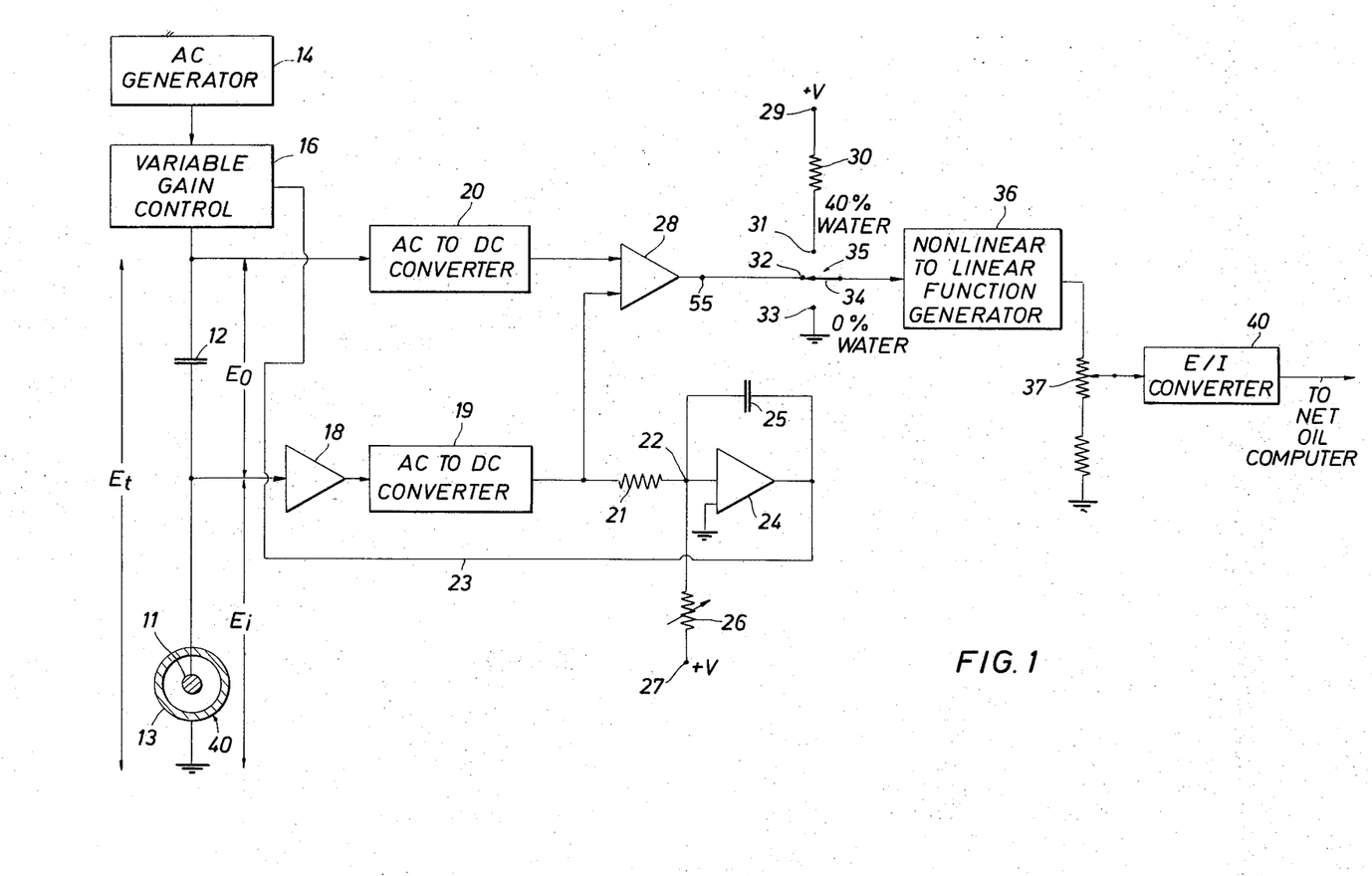
FIG. 1 is a schematic block diagram of the apparatus according to the present invention.

Referring now to FIG. 1, a schematic block diagram of the circuit according to the present invention is shown. An oscillator or a-c voltage generator 14 is shown applying an a-c voltage signal through a variable control 16 to capacitor 12 and the inner element 11 of a conventional capacitance probe unit 10 through which the oil-water emulsion flows. A-C voltage generator 14 and variable gain control 16 could be considered as a single vairable gain oscillator or voltage generator. Connected between variable gain control 16 and capacitor 12 is a first voltage measuring means or an a-c to d-c converter circuit 20 whose output is applied as one input to a difference amplifier 28. Connected between capacitor 12 and capacitance probe 10 is a second voltage measuring means comprising an insolation amplifier 18 whose output is applied directly to an a-c to d-c converter 19, the output of which is applied directly as a second input to difference amplifier 28 which functions as a difference means to subtract the two input signals. The output from the a-c to d-c converter 19 is also applied through a resistor 21 to a summing junction 22 which is in turn connected as an input to an error amplifier 24. Capacitor 25 forms part of the error amplifier circuit and determines the time constant of the error amplifier and feedback loop. Error amplifier 24 and its input summing junction form a voltage detecting means as will hereinafter be further explained. Also connected to the summing junction 22 is a voltage source 27 and a variable resistor 26 which forms the "calibrate" control for the circuit as will be hereinafter further explained.

The output of difference amplifier 28 is applied to switch contact 32 and thence through switch wiper 34 as the input to a nonlinear to linear function generator or conversion means 36. The output of function generator 36 is applied through a potentiometer or "span" control 37 as an input to an E/I converter 40, the output of which is applied to a net oil computer (not shown) for computing the volume of oil flowing in the pipeline. Control 37 acts as a multiplying means for introducing a multiplier as will be further explained.

Switch 35 is shown as a three-position switch with the other two positions being used to test the accuracy of the nonlinear to linear converter circuit. With switch wiper 34 positioned to contact switch contact 33, the input to the function generator 36 is grounded and the function generator should see such a ground signal as 0 percent water. If the output of the function generator is not 0 percent within a acceptable tolerance limits, then function generator 36 is malfunctioning and appropriate remedial action should be taken. When switch 35 is repositioned such that switch wiper 34 is in contact with switch contact 31, a signal equivalent to a 40 percent water input is applied to function generator 36 to test the output of the function generator. Switch contact 31 is connected through resistor 30 to a voltage source 29 for providing a voltage representative of a 40 percent water emulsion. If the output of the function generator 36 is not 40 percent water, then it is known that the function generator is malfunctioning. Of course, other percentages could be utilized for the test function.

Figure 2:
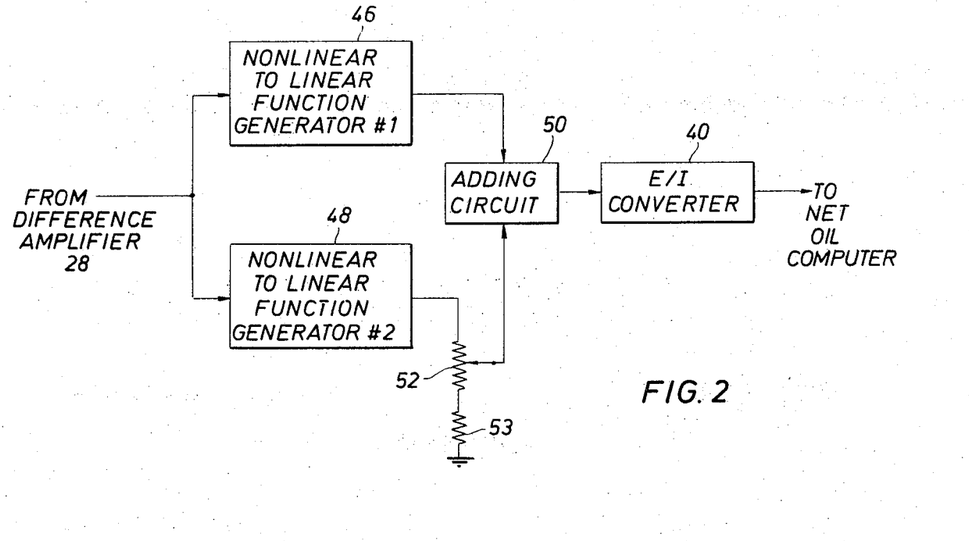
FIG. 2 is a schematic block diagram of another embodiment of the conversion means utilized in converting the signal representing percentage water from a nonlinear to a linear function.

In FIG. 2, a second embodiment of the conversion means or nonlinear to linear function generator circuit is shown. The signal from difference amplifier 28 and switch 35 is applied as inputs to a pair of nonlinear to linear function generators 46 and 48. Function generator 46 converts the nonlinear signal received from difference amplifier 28 over a first portion of the percentage water range of the circuit while the second nonlinear function generator 48 linearizes the output from difference amplifier 28 over the remaining portion of the percentage water range. The output of function generator 46 is applied directly as one input to an adding circuit 50. The output of function generator 48 is applied through a potentiometer or "span" control 52 as a second input to adding circuit 50. Control 52 acts as a multiplying means to vary the linear function as will be hereinafter further explained. The output of adding circuit 50 is applied to an E/I converter 40 (the same converter as described in connection with FIG. 1 above) and thence to a net oil computer (not shown) for computation of the net volume of oil flowing in the pipeline.

Figure 3:
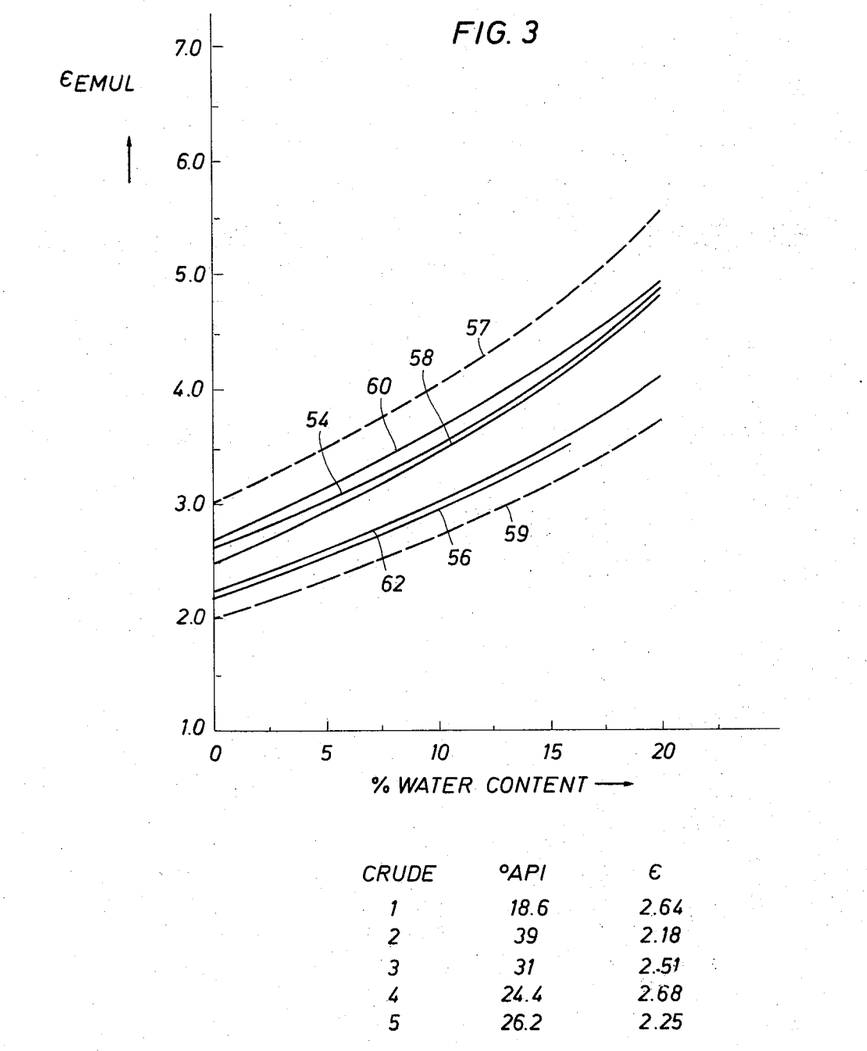
FIG. 3 is a graphical representation of the dielectric constant of oil-water emulsions vs. percent water (0 to 20 percent) for selected crude oils having known percentages of water.
Figure 4:
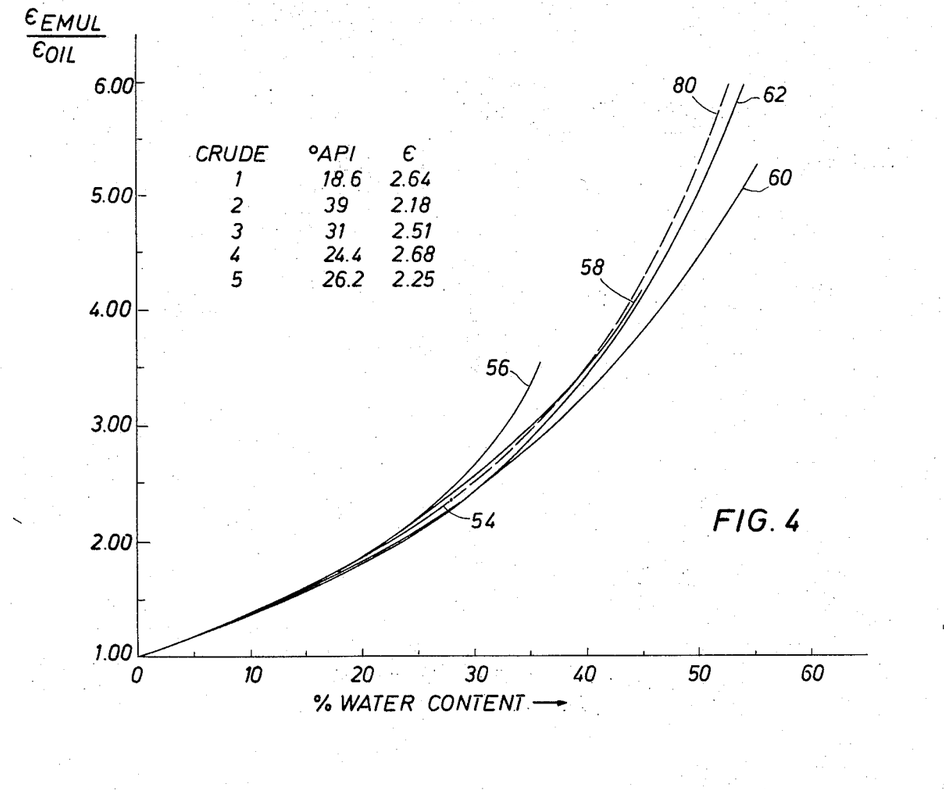
FIG. 4 is a graphical representation of ($\epsilon$emul − 1)/$\epsilon$oil vs. percent water for selected crude oils having known percentages of water.

Referring now to FIGS. 1, 3, 4 and 5, the operation of the circuit will be described. In FIG. 3, five crude oils having varying API gravities and dielectric constants are shown plotted with respect to percentage water below 20 percent water, since this is the typical operating range for most applications. As previously mentioned, all crude oils have a dielectric constant between 2.0 and 3.0 for pure oil, and the curves 47 and 59 show these values. The dielectric constant for a crude oil-water emulsion is some multiple of the dielectric constant of the pure oil. FIG. 4 graphically shows the same five crude oils having the identical API gravities as illustrated in FIG. 3 but normalized to a single index. In both figures, plot 54 is a crude oil having an API gravity of 18.6 and a dielectric constant of 2.64. Plot 56 illustrates a crude having an API gravity of 39 and a dielectric constant of 2.18. Curve 56 shows a crude having an API gravity of 31 and a dielectric constant of 2.51. Plots 60 and 62 illustrate crude oils having API gravities of 24.4 and 26.2 and dielectric constants of 2.68 and 2.65, respectively. The dotted line curve 80 shown in FIG. 4 is the average of the plots 54–62 and is the basic assumed plot of dielectric constant vs. percentage water utilized in this invention. Stated another way, curve 80 could be utilized up to 20 percent water with less than 1 percent error. Between 20 percent and 50 percent water curve 80 can be utilized as the base curve with only about a 1–4 percent error.

The oil-water emulsion flowing in the pipeline passes through capacitance probe 10 where through standard commonly known techniques the capacitance of the oil-water emulsion can be measured as the capacitance between inner and outer probe elements 11 and 13, respectively. A-C generator 14 generates an a-c voltage applied via variable gain control 16 across fixed reference capacitor 12 and the capacitance probe 10 to ground potential and is represented by the voltage drop $E_t$. The voltage drop across the capacitance probe to ground is shown as $E_t$ and the voltage drop across the fixed reference capacitor 12 is shown as $E_o$.

Accordingly, $$E_t = E_o + E_i \quad (1)$$

In the circuit shown, the difference amplifier 28 measures the difference in voltage across the reference capacitor 12, i.e., the voltage drop shown as $E_o$. The a-c voltage applied across reference capacitor 12 is converted to a d-c voltage by a-c to d-c converters 19 and 20 and applied as inputs to difference amplifier 28. Difference amplifier 28 accomplishes the determination $$E_o = E_t - E_i \quad (2)$$

However, $$E_o = E_t C_{10}/C_{12} \quad (3)$$

where:
$C_{10}$ = capacitance measured by capacitance probe 10;
$C_{12}$ = the value of reference capacitor 12

But $$C_{10} = \epsilon_o (1 + A) \quad (4)$$

where:
$\epsilon_o$ = dielectric constant of oil
$A$ = factor relating to percentage water ($A = 0$ when percent water = 0)

Substituting equation (4) into equation (3) results in:

$$E_o = [E_t \epsilon_o (1 + A)]/C_{12} \quad (5)$$

Now, if $E_t$ is always chosen by calibration such that $E_t \epsilon_o = k_1$ (a constant) and $C_{12} = k_2$ (a constant) then $$E_o = [k_1 (1 + A)]/k_2 \quad (6)$$

or $$E_o = K (1 + A) \quad (7)$$

where:

$$K = k_1/k_2$$

If $E_o$, measured as the output of difference amplifier 28, is scaled such that the constant factor K is divided out of equation (7), then $$E_o/K = 1 + A \quad (8)$$

$$E_{oK} = 1 + A$$

But $A$ may also be expressed as:

$$A = (\epsilon_e/\epsilon_o) - 1 \quad (9)$$

where:
$\epsilon_e$ = dielectric constant of the oil-water emulsion;
$\epsilon_o$ = dielectric constant of pure oil Substituting equation (9) into equation (8)

$$E_{oK} = 1 + (\epsilon_e/\epsilon_o) - 1$$

$$E_{oK} = \epsilon_e/\epsilon_o \quad (10)$$

Thus, $E_{oK}$ is defined as the ratio of the dielectric constant of the oil-water emulsion to the dielectric constant of oil. If the output $E_{oK}$ from amplifier 28 at points 55 could be plotted as a nonlinear function, it would follow the average normalized curve 80 shown in FIG. 4. Thus, any plot of dielectric constant for a given crude oil shown in FIG. 3 can be approximated by multiplying curve 80 by a predetermined constant.

The factor A representing percentage water may be derived at the output of amplifier 28 by solving equation (8) thusly:

$$A = E_{oK} - 1 \quad (11)$$

and substituting equation (10):

$$A = (\epsilon_e/\epsilon_o) - 1$$

as reflected in equation (9).

The subtraction of the integer 1 at the output of difference amplifier 28 can be accomplished by utilizing fixed difference or subtracting circuitry (not shown) in the output stage of amplifier 28. Thus the value A representative of percentage water can be obtained directly at point 55 as the output of amplifier 28.

Since the value of A is a nonlinear function, the circuitry of nonlinear to linear function generator 36 is designed to generate a segmented linear approximation of curve 80 as shown as curve 64 in FIG. 5, as will be hereinafter further explained.

In measuring $E_t$, isolation amplifier 18 assures that the junction between capacitance probe 10 and reference capacitor 12 is not loaded. Additionally, the isolation amplifier provides means by which stray or inactive capacitance may be substracted or neutralized. This is important since the stray capacitance appears as a fixed capacitance in parallel with the capacitance measured by the probe, thus introducing errors with reference to different values of $\epsilon$ for various oils. The output of amplifier 18 is applied to a-c to d-c converter 19 where the a-c voltage is detected and converted to a d-c voltage. The output of converter 19 is applied through resistor 21 to a summing junction 22 of error amplifier 24. Amplifier 24 may conveniently be an integrating amplifier. The output of amplifier 24 is connected via a feedback loop 23 to variable gain control 16. Error amplifier 24 operates to inject a predominant time constant within the feedback loop to variable gain control 16, thus rendering the circuit stable. The time constant is determined by capacitance 25, resistance 21 and the gain of the feedback loop from the output of amplifier 24 including variable gain control 16.

A predetermined value for $E_t$ is effectively set by means of variable resistor or "calibrate" control 26 which is connected to a d-c voltage potential 27. The preset voltage entered by resistor 26 causes a predetermined current to flow through resistor 26 to the input summing junction 22. Likewise, the d-c potential output of converter 19 is applied to resistor 21, thus generating a second current applied to summing junction 22. The current through resistor 26 will remain constant depending on the setting of the "calibrate" control. The current through resistor 21 will vary as the actual voltage measurement of $E_i$ across probe 10 varies with the change in dielectric constant of the oil-water emulsion passing through probe 10. If the actual value of $E_i$ as measured across probe 10 varies from its predetermined value as set by "calibrate" control 26, then the current through resistor 21 will vary from, either greater or less than, the value of the constant current through resistor 26.

Error amplifier 24 detects the variation of the currents from resistors 21 and 26 as applied to summing junction 22 and generates a feedback control signal applied through feedback loop conductor 23 to control variable gain control circuit 16 in order to increase or decrease the gain of a-c voltage generator 14 in order to bring the actual value of $E_i$ across probe 10 back to the predetermined value set by resistor 26. In this way resistors 21 and 26, summing junction 22, and error amplifier 24 function as a voltage detecting means for detecting a change in the voltage differential across the probe 10 as it differs from a predetermined voltage set by "calibrate" control 26.

As the gain of a-c voltage generator 14 is varied by means of control 16, in response to the voltage detecting means, the voltage applied across reference capacitor 12 also varies in a direct relationship to the variation in capacitance of probe 10. Accordingly, the measure of the voltage $E_o$ across capacitor 12 is a measure of the percentage water factor A as given in equations (7) and (8) above.

The output of different amplifier 28 is applied to switch contact 32 and through switch wiper 34 of switch 35 as an input to the nonlinear to linear function generator 36. Since $E_{oK}$, the output of difference amplifier 28, is a nonlinear function as can be seen from plot 80 in FIG. 4, a nonlinear to linear function generator 36 is utilized to generate linear functions approximately equal to the nonlinear constant output signal generated by amplifier 28. Nonlinear to linear function generator 36 is accomplished by utilizing conventional operational amplifier circuit techniques to generate a plurality of straight line segments approximating the nonlinear signal output of difference amplifier 28. It has been found advantageous to use five straight line segments in the present apparatus as shown in FIG. 5. However, other combinations of numbers of segments could be utilized.

Figure 5:
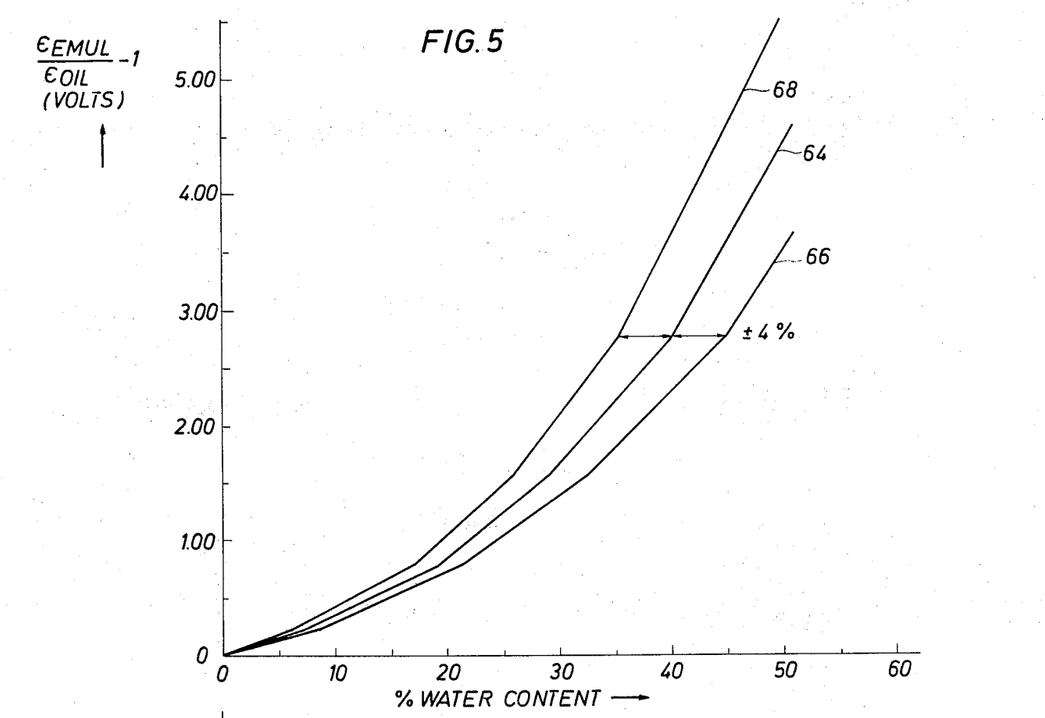
FIG. 5 is a graphical representation of the linearized output of the circuit shown in FIG. 1.

The curve 64 of FIG. 5 is the linear output of function generator 36 with the variable resistor or "span" control 37 in its "zero" or center position. Variable resistor or "span" control 37 can be utilized to continuously vary the slope of the generated function to a maximum plus or minus predetermined percentages as shown by linear function plots 66 and 68, respectively, by multiplying the generated function by a determined constant. In actual practice, it has been found convenient to be able to vary the output of ±4 percent at 40 percent water, but other percentages could be used. The voltage signal output from variable resistor or "span" control 37 is applied as an input to the E/I converter 40 where the voltage signal is converted to a d-c current signal representative of percentage water for convenience in transmission over long lengths of line commonly encountered between the measuring circuit and a remote net oil computer.

Figure 6:
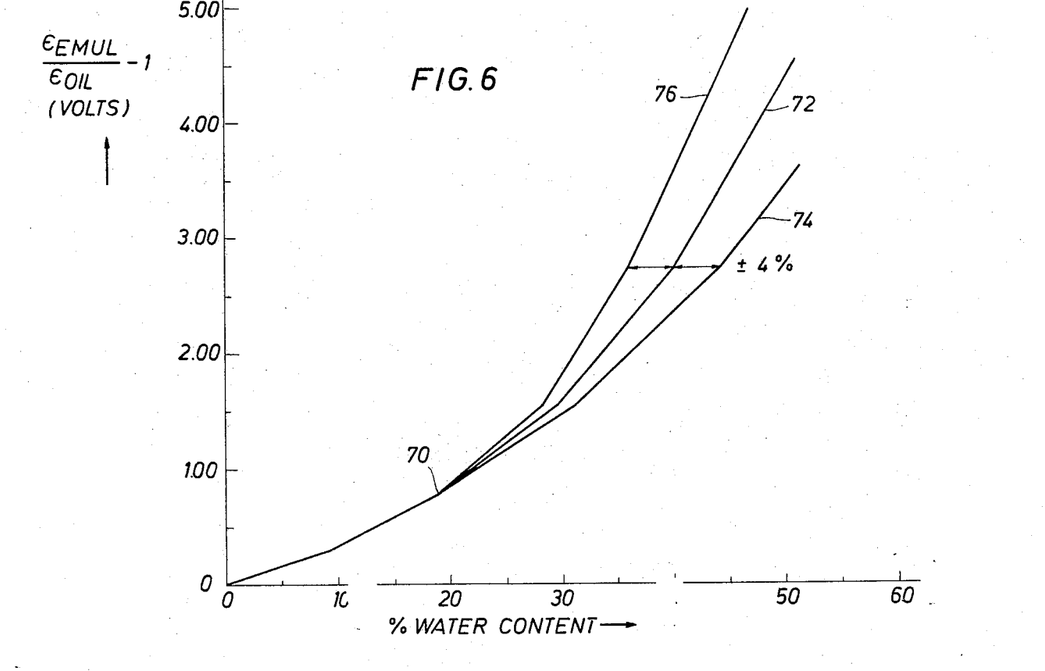
FIG. 6 is the linearized output of the circuit shown in FIG. 1 as modified by the conversion means shown in FIG. 2.

As may be seen in FIG. 5, changing or varying the slope of the linear function generated by function generator 36 by action of the "span" control 37 tilts the entire function plot about the 0 percent water point. For most purposes, this would be within the desired accuracy range needed to insure accurate tracking of oil-water emulsions at higher percentage water contents as shown in FIG. 4, although in some cases there may be small errors introduced in the range of 10-20 percent water. Accordingly, another embodiment of the nonlinear to linear function generator has been devised. Referring to FIG. 2, the signal output from difference amplifier 28 is applied as an input to a plurality of nonlinear to linear function generators 46 and 48. The output of the first function genertor 46 is applied directly as an input to adding circuit 50 and generates the first two segments of the curve 72 shown in FIG. 6 from 0 percent water to point 70 at 18 percent water. The second nonlinear to linear function generator 48 generates the remaining three-segment plot of the function shown as curve 72 in FIG. 6 and is applied through variable resistor or "span" control 52 as a second input to adding circuit 50. Therefore, for signals received from difference amplifier 28 indicating percentage water contents below 18 percent, the entire function will be generated by nonlinear to linear function generator 46. However, above 18 percent water content, the second nonlinear to linear function generator 48 will taken over and generate a linear function applied to adding circuit 50. The "span" control 52 may be utilized to vary the slope of the linear function above 18 percent water to adjust the output to match one of the diverging plots 56-60 as shown in FIG. 4. Plot 72 is shown with the "span" control 52 in its zero position and plots 74 and 76 indicate a variation of a maximum plus or minus predetermined percentage of plot 72, found in actual practice to be most conveniently set at ±4 percent at 40 percent water.

Of course, the selection of 18 percent as the point of transfer between function generator 46 and 48 is arbitrary. It has been found that for most purposes percentage water measurements operate in ranges below 20 percent. But other points could be selected and a plurality of function generator means employed to receive the voltage signal from amplifier 28, each of the function generator means converting the voltage differential signal from a nonlinear to a linear function with respect to percentage water for a predetermimed portion of the percentage water range. To accomplish the percentage variation for accurate calibrating at higher percentage water contents, a multiplier (such as "span" control 52) would be placed in series with at least one of the plurality of function generators to multiply that output by a preselected constant. An adding circuit would be utilized to add the outputs of all function generators and the output of the at least one adding means.

The output of adding circuit 50 is applied to conventional E/I converter 40 which again, as described above, converts the voltage signal to a current signal for convenience in handling in long transmission lines between the measuring circuitry and a net oil computer (not shown). By utilizing the nonlinear to linear function generator circuitry of FIG. 2, the slope of the last three segments of the linear function can be varied about point 70, thereby achieving greater overall accuracy of calibration.

The circuitry may conveniently be calibrated by using a single oil-water emulsion having a known percentage water content. By standardization, the output of all percentage water or percentage oil circuits utilize an output current range of 4 to 20 ma as 0–100 percent or oil. Accordingly, if a sample oil having a known 10 percent content is utilized for calibration, then with the known oil-water emulsion in the probe, the "calibrate" potentiometer 26 is adjusted until the output current from converter 40 equals 5.6 ma or 10 percent of full scale with the "span" control 37 or 52 set to its "0" position. Once this single calibration adjustment has been made, preferably with a known percentage water content below 18 percent, the circuitry is calibrated for that crude and is ready to handle other percentage water contents. Accuracy of 1 percent or better has been achieved with the circuitry of embodiments of FIGS. 1 and 2.

Of course, "calibrate" potentiometer 26 may conveniently be located at a remote location. For instance, in calibrating for several known crudes, predetermined values of resistors may be switched into the circuit to calibrate for known crude runs. Or the remote calibration may utilize a variable resistor for adjusting $E_i$ to a determined value. Having a remote capability and having only to utilize one known oil-emulsion sample to calibrate the circuit adds great flexibility not available in the prior art, where numerous samples were necessary, coupled with several painstaking calibration adjustments.

In the event that the percentage water readings vary from the actual percentages, as will often happen at higher percentage water-oil-emulsions and because of contaminating elements or minerals present in the emulsion that tend to change the dielectric constant slightly, the fine "span" control 37 or 52 may be utilized to make refinement adjustments in the output. In the embodiment of FIG. 1, the "span" control 37 can be utilized to vary the output at any point above 0 percent water by a known percentage to correct the output current signal to agree with the actual water percentage of the oil-water emulsion. If the embodiment of FIG. 2 is utilized, the "span" control will make corrections within a predetermined percentage range only above 18 percent water. Of course, other points may be selected at which the second function generator 48 takes over the generator of the linear function, but 18 percent water has been found to be a convenient point for all purposes.

The output of the nonlinear to linear function generators in FIGS. 1 and 2 may be checked by positioning the switch wiper of switch 35 in either the 0 percent or 40 percent water position. With switch wiper 34 positioned to contact switch contact 33 which is connected to ground, a signal of zero volts indicating a 0 percent water is applied to the input of the function generators 36 or 46 which should generate an equivalent zero volts output. With the switch wiper 34 positioned to contact switch contact 31 a predetermined voltage is applied from voltage source 29 via resistor 30 to equal 40 percent water with the "span" control 37 or 52 in its zero or center position. Accordingly, the output of the function generator 36 or 48 should be a value equal to 40 percent water.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. Apparatus for measuring the percentage water content of an oil-water emulsion, comprising
   capacitance probe means for measuring the capacitance of the oil-water emulsion,
   a reference capacitor of known value connected in series with said capacitance probe means,
   a variable gain a-c voltage generator connected in series with said reference capacitor and said capacitor probe means for applying an a-c voltge across said capacitor and probe means,
   voltage detecting means for detecting a change in the voltage differential across said probe means and controlling the gain of said a-c voltage generator for maintaining a predetermined a-c voltage applied across said probe means, and
   voltage measuring means for measuring the voltage differential applied across said reference capacitor as a measure of the percentage water content of the oil-water emulsion.

2. The apparatus as described in claim 1, wherein said voltage measuring means comprises
   first voltage measuring means connected between said a-c voltage generator and reference capacitor for measuring the total voltage differential applied across said reference capacitor and capacitance probe means and generating a signal representative thereof,
   second voltage measuring means connected between said reference capacitor and capacitance probe means for measuring the voltage differential applied across said capacitance probe means and generating a signal representative thereof, and
   difference means connected to said first and second voltage measuring means for subtracting said signal representative of the voltage differential across said reference capacitor and capacitance probe means and generating a signal representative of the voltage differential across said reference capacitor.

3. The apparatus as described in claim 2, wherein said voltage detecting means comprises
   an error measuring means the output of which is connected as a feedback loop to said a-c voltage generator,
   a variable resistor connected between a voltage source and a summing junction input to said error measuring means for generating a first current the magnitude of which is directly related to said predetermined a-c voltage differential desired to be maintained across said capacitance probe means, and
   a fixed resistor connected between the output of said second voltage measuring means and said summing junction input to said error measuring means for receiving said signal representative of the actual voltage differential across said capacitance probe means and generating a second current of opposite polarity to said first current which is directly related to the actual voltage differential across said capacitance probe means, said first and second currents being algebraically summed at said summing junction and applied as an input to said error measuring means for generating in response thereto an error feedback signal for controlling the gain of said a-c voltage generator to cause said actual voltage differential across said capacitance probe means to equal said desired predetermined a-c voltage differential.

4. The apparatus as described in claim 3, wherein said first voltage measuring means comprises a first voltage converter circuit for converting said total a-c voltage applied across said reference capacitor and said capacitance probe means to a d-c voltage signal.

5. The apparatus as described in claim 4, wherein said second voltage measuring means comprises an isolation amplifier connected between said reference capacitor and capacitance probe means for subtracting stray capacitance that may appear in parallel with said capacitance probe means and generating an a-c voltage output representative of said voltage differential applied across said capacitance probe means, and a second voltage converter circuit receiving said a-c voltage output of said isolation amplifier and converting said a-c voltage to a d-c voltage signal.

6. The apparatus as described in claim 5, wherein said difference means comprises a difference amplifier for receiving the d-c voltage outputs of said first and second voltage converter circuits and subtracting the d-c voltage outputs to obtain a d-c voltage differential signal directly representative of the percentage water content of the oil-water emulsion.

7. The apparatus as described in claim 6, wherein said error measuring means comprises an error amplifier having an input summing junction for receiving said first and second currents from said fixed and variable resistors.

8. The apparatus described in claim 1, further including function generator means receiving said measured voltage differential from said voltage measuring means and converting said voltage differential from a nonlinear to a linear function with respect to percentage water, and multiplying means for multiplying said voltage output from said function generator by a preselected value.

9. The apparatus described in claim 8, further including voltage to current conversion means to convert the multiplied d-c voltage signal output from said multiplying means to a direct current the magnitude of which is representative of the percentage water content of the oil-water emulsion.

10. The apparatus described in claim 1, further including first function generator means receiving said measured voltage differential from said voltage measuring means and converting said voltage differential from a nonlinear to a linear function with respect to percentage water for a first portion of the percentage water range, second function generator means in parallel with said first function generator means receiving said measured voltage differential from said voltage measuring means and converting said voltage differential from a nonlinear to a linear function with respect to percentage water for the remaining portion of the percentage water range, multiplying means in series with said second function generator means for multiplying said voltage output from said second function generator by a preselected value, and means for adding the voltage output from said first function generator means and said multiplying means.

11. The apparatus described in claim 10, further including voltage to current conversion means for converting the d-c voltage signal output from said adding means to a direct current the magnitude of which is representative of the percentage water content of the oil-water emulsion.

12. The apparatus described in claim 11, further including a plurality of function generator means for receiving said measured voltage differential from said voltage measuring means, each of said plurality of function generator means converting said voltage differential from a nonlinear to a linear function with respect to percentage water for a predetermined portion of the percentage water range, a multiplying means in series with at least one of said plurality of function generator means for multiplying said voltage output from said at least one of said function generator means by a preselected value, and means for adding the voltage output from said multiplying means and each of said remaining function generator means.

13. The apparatus as described in claim 12, further including voltage to current conversion means for converting the d-c voltage signal output from said adding means to a direct current the magnitude of which is representative of the percentage water content of the oil-water emulsion.

14. Apparatus for measuring the percentage water content of an oil-water emulsion, comprising capacitance probe means for measuring the capacitance of the oil-water emulsion, a reference capacitor of known value connected in series with said capacitance probe means, a variable gain a-c voltage generator connected in series with said reference capacitor and said capacitance probe means for applying an a-c voltage across said capacitor and probe means, calibrate control means for predetermining the a-c voltage desired to be maintained across said capacitance probe means, voltage detecting means for detecting a change in the voltage differential across said probe means and controlling the gain of said a-c voltage generator for maintaining said predetermined a-c voltage applied across said probe means, voltage measuring means for measuring the voltage differential applied across said reference capacitor as a measure of the percentage water content of the oil-water emulsion, and conversion means for converting said voltage differential from a nonlinear to a linear function representative of percentage water content of the oil-water emulsion.

15. The apparatus as described in claim 14, wherein said voltage measuring means comprises
   a first voltage converter circuit connected between said a-c voltage generator and reference capacitor for measuring the total a-c voltage differential applied across said reference capacitor and capacitance probe means and converting said a-c voltage differential to a d-c voltage signal,
   an isolation amplifier connected between said reference capacitor and capacitance probe means for subtracting stray capacitance that may appear in parallel with said capacitance probe means and generating an a-c voltage output representative of said voltage differential applied across said capacitance probe means,
   a second voltage converter circuit receiving said a-c voltage output of said isolation amplifier and converting said a-c voltage to a d-c voltage signal, and
   a difference amplifier for receiving the d-c voltage outputs of said first and second voltage converter circuits and subtracting the d-c voltage outputs to obtain a d-c voltage differential signal directly representative of the percentage water content of the oil-water emulsion.

16. The apparatus as described in claim 15, wherein said calibrate control means comprises a variable resistor connected between a voltage source and input summing junction of said voltage detecting means for producing a first current the magnitude of which is directly related to said predetermined a-c voltage differential desired to be maintained across said capacitance probe means.

17. The apparatus as described in claim 16, wherein said voltage detecting means comprises
   an error amplifier having said input summing junction and an output which is connected as a feedback loop to said a-c voltage generator, and
   a fixed resistor connected between the output of said second voltage converter circuit and said input summing junction of said error amplifier for receiving said voltage signal representative of the actual voltage differential across said capacitance probe means and producing a second current of opposite polarity to said first current, the magnitude of which is directly related to the actual voltage differential across said capacitance probe means,
   said first and second currents being algebraically summed at said summing junction and applied as an input to said error measuring means for generating in response thereto an error feedback signal for controlling the gain of said a-c voltage generated to cause said actual voltage differential across said capacitance probe means to equal said desired predetermined a-c voltage differential.

18. The apparatus described in claim 14, wherein said conversion means comprises
   function generator means receiving said measured voltage differential from said voltage measuring means and converting said voltage differential from a nonlinear to a linear function with respect to percentage water, and
   multiplying means for multiplying said voltage output from said function generator by a preselected value.

19. The apparatus described in claim 18, further including voltage to current conversion means to convert the multiplied d-c voltage signal output from said multiplying means to a direct current the magnitude of which is representative of the percentage water content of the oil-water emulsion.

20. The apparatus described in claim 14, wherein said conversion means comprises
   first function generator means receiving said measured voltage differential from said voltage measuring means and converting said voltage differential from a nonlinear to a linear function with respect to percentage water for a first portion of the percentage water range,
   second function generator means in parallel with said first function generator means receiving said measured voltage differential from said voltage measuring means and converting said voltage differential from a nonlinear to a linear function with respect to percentage of water for the remaining portion of the percentage water range,
   multiplying means in series with said second function generator means for multiplying said voltage output from said second function generator by a preselected value, and
   means for adding the voltage output from said first function generator means and said multiplying means.

21. The apparatus described in claim 20, further including voltage to current conversion means for converting the d-c voltage signal output from said adding means to a direct current the magnitude of which is representative of the percentage water content of the oil-water emulsion.

22. The apparatus described in claim 14, wherein said conversion means comprises
   a plurality of function generator means for receiving said measured voltage differential from said voltage measuring means, each of said plurality of function generator means converting said voltage differential from a nonlinear to a linear function with respect to percentage water for a predetermined portion of the percentage water range,
   a multiplying means in series with at least one of said plurality of function generator means for multiplying said voltage output from said at least one of said function generator means by a preselected value, and
   means for adding the voltage output from said multiplying means and each of said remaining function generator means.

23. The apparatus as described in claim 22, further including voltage to current conversion means for converting the d-c voltage signal output from said adding means to a direct current the magnitude of which is representative of the percentage water content of the oil-water emulsion.

24. Apparatus for measuring the percentage water content of an oil-water emulsion, comprising
   capacitance probe means for measuring the capacitance of the oil-water emulsion,
   a reference capacitor of known value connected in series with said capacitance probe means,
   an a-c voltage generator connected in series with said reference capacitor and said capacitance probe means for applying an a-c voltage across said capacitor and probe means,
   calibrate control means for predetermining the a-c voltage desired to be maintained across said capacitance probe means, variable gain means connected to said a-c voltage generator for detecting a change in the actual voltage differential across said probe means and controlling the gain of said a-c voltage generator for attempting to maintain said predetermined a-c voltage applied across said probe means, voltage measuring means for measuring the voltage differential applied across said reference capacitor as a measure of the percentage water content of the oil-water emulsion, and function conversion means for converting said voltage differential from a nonlinear to a linear function representative of percentage water content of the oil-water emulsion.

25. The apparatus as described in claim 24, wherein said voltage measuring means comprises a first voltage converter circuit connected between said a-c voltage generator and reference capacitor for measuring the total a-c voltage differential applied across said reference capacitor and capacitance probe means and converting said a-c voltage differential to a d-c voltage signal, an isolation amplifier connected between said reference capacitor and capacitance probe means for subtracting stray capacitance that may appear in parallel with said capacitance probe means and generating an a-c voltage output representative of said voltage differential applied across said capacitance probe means, a second voltage converter circuit receiving said a-c voltage output of said isolation amplifier and converting said a-c voltage to a d-c voltage signal, and a difference amplifier for receiving the d-c voltage outputs of said first and second voltage converter circuits and subtracting the d-c voltage outputs to obtain a d-c voltage differential signal directly representative of the percentage water content of the oil-water emulsion.

26. The apparatus as described in claim 24, wherein said calibrate control means comprises a variable resistor connected between a voltage source and an input summing junction of said variable gain means for producing a first current the magnitude of which is directly related to said predetermined a-c voltage differential desired to be maintained across said capacitance probe means.

27. The apparatus as described in claim 26, wherein said variable gain means comprises a variable gain connected between said a-c voltage generator and said reference capacitor for controlling the gain of said a-c voltage generator, an error amplifier having said input summing junction and an output which is connected as a feedback loop to said variable gain circuit, and a fixed resistor connected between the output of said second voltage converter circuit and said input summing junction of said error amplifier for receiving said signal representative of the voltage differential across said capacitance probe means and producing a second current of a polarity opposite to that of said first current, the magnitude of which is directly related to the actual voltage differential across said capacitance probe means, said error amplifier subtracting said first and second currents and generating in response thereto an error feedback signal for controlling the operation of said variable gain circuit to cause said actual voltage differential across said probe means to coincide with said predetermined voltage differential.

28. The apparatus described in claim 24, wherein said function conversion means comprises a first function generator means receiving said measured voltage differential from said voltage measuring means and converting said voltage differential from a nonlinear to a linear function with respect to percentage water for a first portion of the percentage water range, second function generator means in parallel with said first function generator means receiving said measured voltage differential from said voltage measuring means and converting said voltage differential from a nonlinear to a linear function with respect to percentage water for the remaining portion of the percentage water range, multiplying means in series with said second function generator means for multiplying said voltage output from said second function generator by a preselected value, and means for adding the voltage output from said first function generator means and said multiplying means.

29. The apparatus described in claim 28, further including voltage to current conversion means for converting the d-c voltage signal output from said adding means to a direct current the magnitude of which is representative of the percentage water content of the oil-water emulsion.

30. Apparatus for measuring the percentage water content of an oil-water emulsion, comprising capacitance probe means for measuring the capacitance of the oil-water emulsion, a reference capacitor of known value connected in series with said capacitance probe means, a variable gain a-c voltage generator connected in series with said reference capacitor and said capacitance probe means for applying an a-c voltage across said capacitor and probe means, first voltage measuring means connected between said a-c voltage generator and reference capacitor for measuring the total voltage differential applied across said reference capacitor and capacitance probe means and generating a signal representative thereof, second voltage measuring means connected between said reference capacitor and capacitance probe means for measuring the voltage differential applied across said capacitance probe means and generating a signal representative thereof, difference means connected to said first and second voltage measuring means for subtracting said signal representative of the voltage differential across said probe means from said signal representative of the total voltage differential across said reference capacitor and capacitance probe means and generating a signal representative of the voltage differential across said reference capacitor, said voltage differential across said reference capacitor being a measure of the percentage water content of the oil-water emulsion, error measuring means the output of which is connected as a feedback loop to said a-c voltage generator, a fixed resistor connected between the output of said second voltage measuring means and said error measuring means for receiving said signal representative of the voltage differential across said capacitance probe means and generating a first current the magnitude of which is directly related to the actual voltage differential across said capacitance probe means, and a variable resistor connected between a source of predetermined voltage and said error measuring means for generating a second current of polarity opposite to said first current, the magnitude of which is directly related to said predetermined a-c voltage differential desired to be maintained across said capacitance probe means, said error measuring means subtracting said first and second currents and generating in response thereto an error feedback signal applied to said a-c voltage generator for controlling the gain of said a-c voltage generator to cause said actual voltage differential across said probe means to coincide with said predetermined voltage differential.

31. The apparatus as described in claim 30, wherein said first voltage measuring means comprises a first voltage converter circuit for converting said total a-c voltage applied across said reference capacitor and said capacitance probe means to a d-c voltage signal.

32. The apparatus as described in claim 30, wherein said second voltage measuring means comprises
    an isolation amplifier connected between said reference capacitor and capacitance probe means for subtracting stray capacitance that may appear in parallel with said capacitance probe means and generating an a-c voltage output representative of said voltage differential applied across said capacitance probe means, and
    a second voltage converter circuit receiving said a-c voltage output of said isolation amplifier and converting said a-c voltage to a d-c voltage signal.

33. The apparatus as described in claim 30, wherein said difference means comprises a difference amplifier for receiving the d-c voltage outputs of said first and second voltage converter circuits and subtracting the d-c voltage outputs to obtain a d-c voltage differential signal directly representative of the percentage water content of the oil-water emulsion.

34. The apparatus as described in claim 30, wherein said error measuring means comprises an error amplifier having an input summing junction for receiving said first and second currents from said fixed and variable resistors.

35. The apparatus described in claim 30, further including
    function generator means receiving said measured voltage differential from said difference means and converting said voltage differential from a nonlinear to a linear function with respect to percentage water, and
    multiplying means for multiplying said voltage output from said function generator by a preselected value.

36. The apparatus described in claim 35, further including voltage to current conversion means to convert the multiplied d-c voltage signal output from said multiplying means to a direct current the magnitude of which is representative of the percentage water content of the oil-water emulsion.

37. The apparatus described in claim 30, further including
    a plurality of function generator means for receiving said measured voltage differential from said difference means, each of said plurality of function generator means converting said voltage differential from a nonlinear to a linear function with respect to percentage water for a predetermined portion of the percentage water range,
    a multiplying means in series with at least one of said plurality of function generator means for multiplying said voltage output from said at least one of said function generator means by a preselected value, and
    means for adding the voltage output from said multiplying means and each of said remaining function generator means.

38. The apparatus as described in claim 37, further including voltage to current conversion means for converting the d-c voltage signal output from said adding means to a direct current the magnitude of which is representative of the percentage water content of the oil-water emulsion.

39. Apparatus for measuring the percentage water content of an oil-water emulsion, comprising
    capacitance probe means for measuring the capacitance of the oil-water emulsion,
    a reference capacitor of known value connected in series with said capacitance probe means,
    a variable gain a-c voltage generator connected in series with said reference capacitor and said capacitance probe means for applying an a-c voltage across said capacitor and probe means,
    a first voltage converter circuit connected between said a-c voltage generator and reference capacitor for measuring the total a-c voltage differential applied across said reference capacitor and capacitance probe means and converting said a-c voltage differential to a d-c voltage signal,
    an isolation amplifier connected between said reference capacitor and capacitance probe means for subtracting stray capacitance that may appear in parallel with said capacitance probe means and generating an a-c voltage output representative of said voltage differential applied across said capacitance probe means,
    a second voltage converter circuit receiving said a-c voltage output of said isolation amplifier and converting said a-c voltage to a d-c voltage signal,
    a difference amplifier for receiving the d-c voltage outputs of said first and second voltage converter circuits and subtracting the d-c voltage outputs to obtain a d-c voltage differential signal directly representative of the percentage water content of oil-water emulsion,
    an error amplifier having an input summing junction and an output which is connected as a feedback loop to said a-c voltage generator,
    a fixed resistor connected between the output of said second voltage converter circuit and said input summing junction of said error amplifier for receiving said signal representative of the voltage differential across said capacitance probe means and producing a first current the magnitude of which is directly related to the actual voltage differential across said capacitance probe means, a variable resistor connected between a source of predetermined voltage and said input summing junction of said error amplifier for producing a second current of polarity opposite to that of said first current, the magnitude of which is directly related to said predetermined a-c voltage differential sought to be maintained across said capacitance probe means, said error amplifier algebraically adding said first and second currents and generating in response thereto an error feedback signal for controlling the gain of said a-c voltage generator to cause said actual voltage differential to coincide with said predetermined voltage differential, first function generator means receiving said measured voltage differential from said difference amplifier and converting said voltage differential from a nonlinear to a linear function with respect to percentage water for a first portion of the percentage water range, second function generator means in parallel with said first function generator means receiving said measured voltage differential from said difference amplifier and converting said voltage differential from a nonlinear to a linear function with respect to percentage water for the remaining portion of the percentage water range, multiplying means in series with said second function generator means for multiplying said voltage output from said second function generator by a preselected constant, means for adding the voltage output from said first function generator means and said multiplying means, and voltage to current conversion means for converting the d-c voltage signal output from said adding means to a direct current the magnitude of which is representative of the percentage water content of the oil-water emulsion.

40. A method of measuring the percentage water content of an oil-water emulsion, comprising the steps of applying an a-c voltage across a reference capacitor and a series connected capacitance probe utilized to measure the capacitance of the oil-water emulsion, measuring the actual voltage differential across said capacitance probe, varying the a-c voltage applied across said reference capacitor and series connected capacitance probe to maintain the voltage differential across said capacitance probe at a predetermined level, measuring the total voltage differential across said series connected reference capacitor and capacitance probe, and determining the difference in said measured total voltage differential and said actual voltage differential to determine the voltage differential across said reference capacitor which is a measure of the percentage water content of the oil-water emulsion.

* * * * *

PO-1050
(5/69)

UNITED STATES PATENT OFFICE
CERTIFICATE OF CORRECTION

Patent No. 3,768,006          Dated October 23, 1973

Inventor(s) Allen Howard Mueller

It is certified that error appears in the above-identified patent and that said Letters Patent are hereby corrected as shown below:

Col. 1, line 41, "without" should read --within--.

Col. 4, line 37, "47" should read --57--.

Col. 8, line 34, "taken" should read --take--;
line 54, "predetermimed" should read --predetermined--.

Col. 9, line 12, between "percent" and "content" insert --water--; line 57, after "wiper" insert --34--.

Col. 10, line 19, "voltge" should read --voltage--.

Col. 12, line 18, "11" should read --1--.

Col. 15, line 49, insert after "gain" the word --circuit--.

Signed and sealed this 8th day of October 1974.

(SEAL)
Attest:

McCOY M. GIBSON JR.
Attesting Officer

C. MARSHALL DANN
Commissioner of Patents